(12) United States Patent
Cairns

(10) Patent No.: US 11,035,289 B2
(45) Date of Patent: Jun. 15, 2021

(54) KINETIC ENERGY RECOVERY BOOSTING SYSTEM FOR TURBOCHARGER UTILISING HYDRAULIC BRAKING

(71) Applicant: VN-AC IP LTD, London (GB)

(72) Inventor: Alasdair Cairns, London (GB)

(73) Assignee: VN-AC IP LTD, London (GB)

( * ) Notice: Subject to any disclaimer, the term of this patent is extended or adjusted under 35 U.S.C. 154(b) by 0 days.

(21) Appl. No.: 16/465,252

(22) PCT Filed: Nov. 30, 2017

(86) PCT No.: PCT/EP2017/080920
§ 371 (c)(1),
(2) Date: May 30, 2019

(87) PCT Pub. No.: WO2018/100033
PCT Pub. Date: Jun. 7, 2018

(65) Prior Publication Data
US 2019/0323423 A1 Oct. 24, 2019

(30) Foreign Application Priority Data

Nov. 30, 2016 (GB) .................................... 1620316

(51) Int. Cl.
| | | |
|---|---|---|
| F02B 37/14 | (2006.01) | |
| F02B 37/10 | (2006.01) | |
| F02B 39/08 | (2006.01) | |
| F02C 6/12 | (2006.01) | |
| F02C 6/14 | (2006.01) | |

(52) U.S. Cl.
CPC .............. *F02B 37/14* (2013.01); *F02B 37/10* (2013.01); *F02B 39/085* (2013.01); *F02C 6/12* (2013.01); *F02C 6/14* (2013.01); *F05D 2220/40* (2013.01); *F05D 2220/60* (2013.01)

(58) Field of Classification Search
CPC .......... F02B 37/04; F02B 37/10; F02B 37/14; F02B 39/08; F02B 39/085; F02C 6/12; F02C 6/14; Y02E 60/15; Y02E 60/17; Y02T 10/6208; Y02T 10/6282
See application file for complete search history.

(56) References Cited

U.S. PATENT DOCUMENTS

| | | | | |
|---|---|---|---|---|
| 4,201,049 A | * | 5/1980 | Tobber | .................... F02C 1/002 |
| | | | | 417/92 |
| 2012/0180481 A1 | * | 7/2012 | Kapich | ................... F02B 37/10 |
| | | | | 60/606 |

FOREIGN PATENT DOCUMENTS

| | | | |
|---|---|---|---|
| EP | 0659983 A1 | 6/1995 | |
| JP | 3487046 B2 | 1/2004 | |
| WO | 2009026134 A2 | 2/2009 | |
| WO | 2016063266 A2 | 4/2016 | |
| WO | WO-2016063266 A2 * | 4/2016 | .............. F02B 37/00 |
| WO | PCT/EP2017/080920 | 2/2018 | |

* cited by examiner

*Primary Examiner* — Jesse S Bogue
*Assistant Examiner* — Loren C Edwards
(74) *Attorney, Agent, or Firm* — Ryan, Mason & Lewis, LLP

(57) ABSTRACT

The invention provides a vehicle engine system, comprising: a hydraulic pump for providing an oil supply during braking; an accumulator configured to: receive the oil supply during braking; store the oil supply under pressure; and release the oil supply under pressure during acceleration; and a turbo charger for receiving the oil supply released under pressure during acceleration.

10 Claims, 5 Drawing Sheets

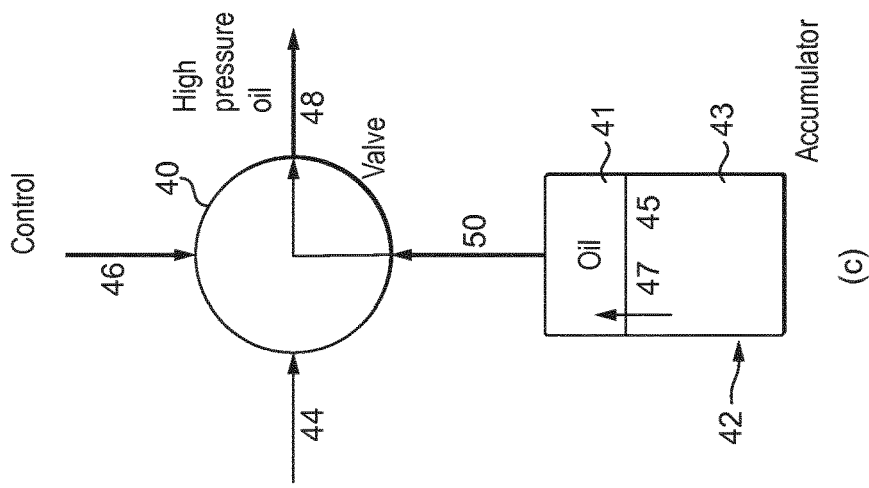
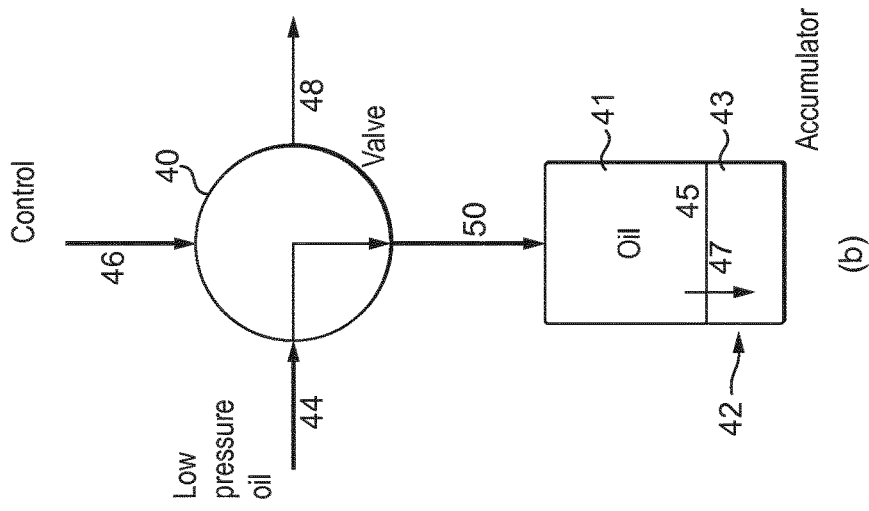
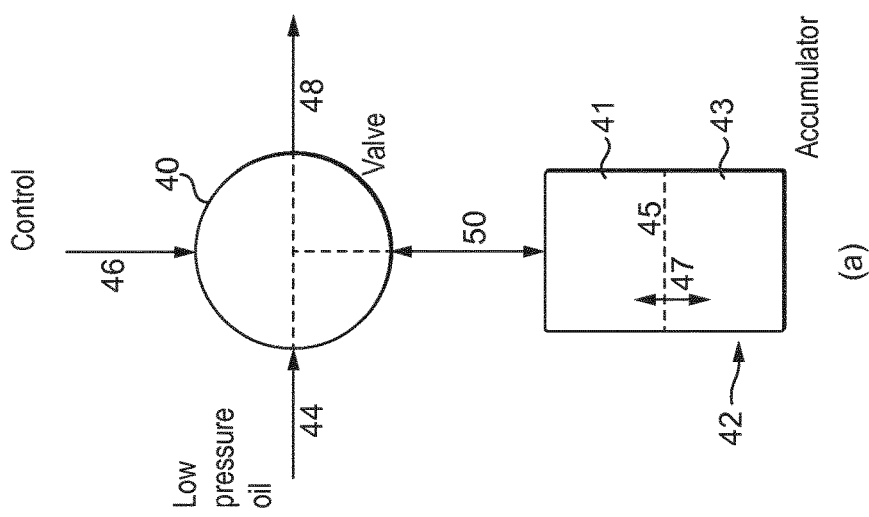
FIG. 2

KINETIC ENERGY RECOVERY BOOSTING SYSTEM FOR TURBOCHARGER UTILISING HYDRAULIC BRAKING

BACKGROUND TO THE INVENTION

Field of the Invention

The present invention relates to the capture of energy using hydraulics during braking of a vehicle, and then using that captured energy to drive a turbocharger subsequent to the braking operation.

Description of the Related Art

It is known in the art to provide a system in which kinetic energy is captured during braking of a vehicle. In a subsequent operation, such as acceleration, the captured energy is used in order to assist the engine of the vehicle.

Use of a hydraulic system is more cost-effective than use of an electrical system, and has the potential to recover a larger proportion of braking energy due to higher power density.

It is known to use turbochargers in engines. One known characteristics of turbochargers is that a delay may be caused on acceleration due to a lag in delivering air to the turbocharger during acceleration.

It is an aim of the present invention to provide for a kinetic energy recovery boost system, which utilises a hydraulic approach, and in which the lag of the turbocharger associated with the delivery of air is minimised.

SUMMARY OF THE INVENTION

In accordance with the invention, a turbocharger in the engine is "spun up" as quickly as possible with a mechanical mechanism. The braking system is used to capture kinetic energy, and then the captured energy is used to "spin up" the turbocharger quickly, and consequently provide an air flow in the turbocharger quickly.

Under braking, a clutched hydraulic pump is preferably engaged. This pumps an oil supply into a valve (a hydraulic accumulator). This valve stores the pumped oil under pressure. When the vehicle accelerates, the valve is released, and the oil stored under pressure is released. This oil is delivered to a turbocharger. As it is released having been stored under pressure, it is released quickly. It is delivered to the turbocharger using a nozzle assembly. The delivery of oil is used to provide an air flow. As a result turbocharger lag can be avoided.

Braking energy captured in this way provides a drive specifically to a turbocharger.

In accordance with the invention there is provided a vehicle engine system comprising: a hydraulic pump for providing an oil supply during braking; an accumulator configured to: receive the oil supply during braking; store the oil supply under pressure; and release the oil supply under pressure during acceleration; and a turbo charger for receiving the oil supply released under pressure during acceleration.

The vehicle engine system may further comprise a mechanism for converting the oil supply released under pressure to an air flow for the turbocharger. The mechanism comprises a rotational element, the rotational element being rotated by the oil supply released under pressure to create an air flow for the turbocharger. The mechanism may further comprise a nozzle for distributing the oil supply released under pressure.

The accumulator comprises a compression chamber and an oil chamber, wherein the oil chamber expands as oil is stored, and the compression chamber applies compression to the oil chamber.

The vehicle engine system may further comprise a mechanism for selectively routing oil to the accumulator. The vehicle engine system may further comprise a mechanism for selectively delivering oil from the accumulator.

The invention also provides a method of controlling an engine including a turbocharger comprising: storing oil under pressure during a hydraulic braking operation; and releasing the stored oil under pressure, during an acceleration operation, to the turbocharger.

The method may further comprise the step of generating an air flow in the turbocharger in dependence on the released oil.

The oil may be stored during a braking operation. The oil may be released subsequent to a braking operation. The oil may be stored when a clutch is engaged. The oil may be released when a clutch is engaged.

Preferably the described technique is applied while the clutch is engaged during braking, or during acceleration, or when the accelerator is not engaged.

BRIEF DESCRIPTION OF THE FIGURES

The invention is now described further with reference to the following figures, in which:

FIGS. 2(a) to 2(c) illustrate the exemplary principle of energy capture during braking and energy delivery during acceleration;

DESCRIPTION OF PREFERRED EMBODIMENTS

The invention is described by way of reference to capturing energy in a vehicle during a braking process, and then using that captured energy in the vehicle in a subsequent acceleration process. One skilled in the art will appreciate that the invention is not limited to the use of the captured energy in a subsequent acceleration process, and the captured energy may be utilised in any operation after the energy has been captured during braking.

Figure 1:
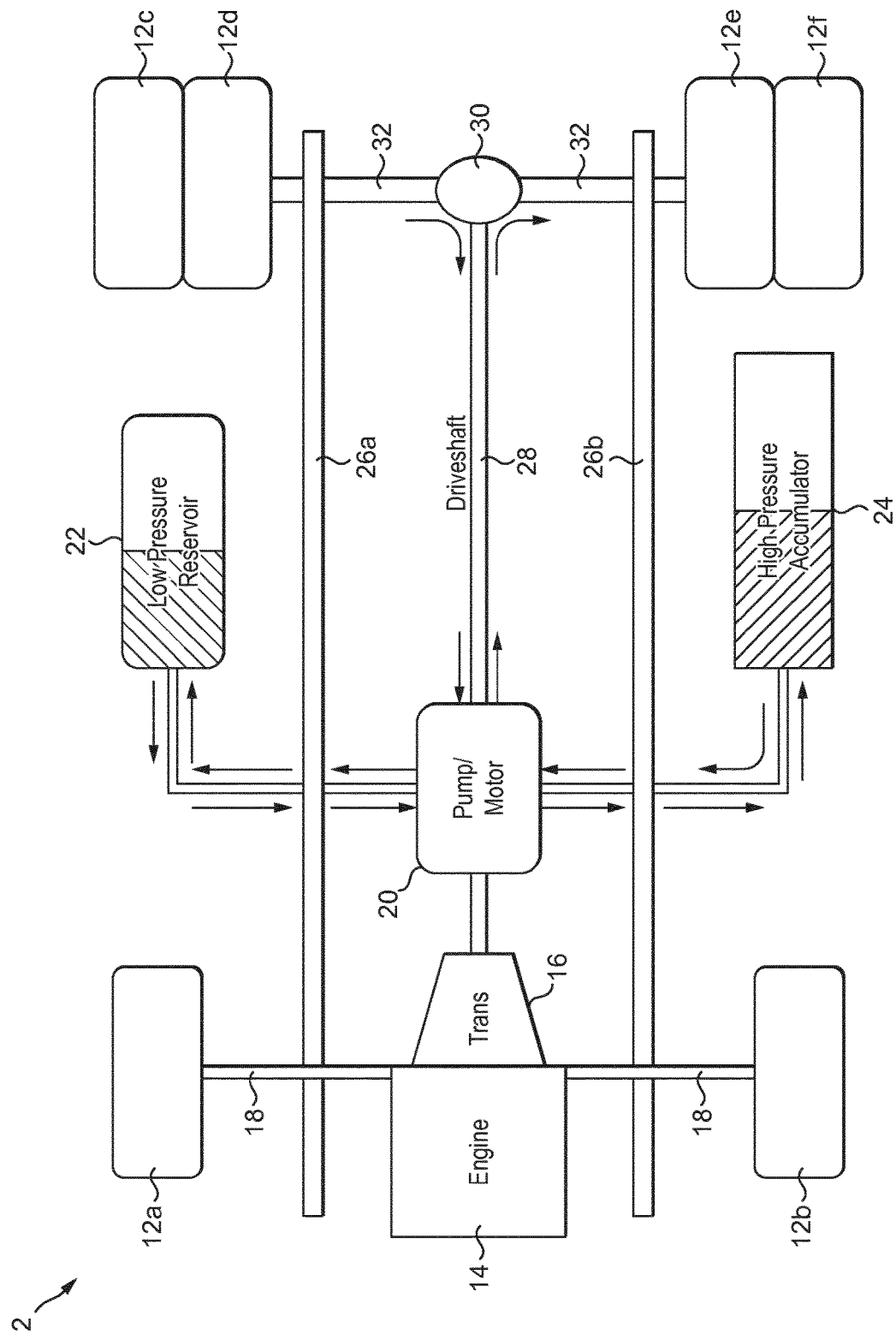
FIG. 1 illustrates a general overview of an exemplary hydraulic hybrid system for a vehicle.

With reference to FIG. 1, there is generally illustrated as denoted by reference numeral 2 elements of a vehicle including elements of a preferred system as described. The exemplary vehicle made reference to in this description is a truck, but the described system may be used in conjunction with any vehicle.

The wheelbase of an exemplary truck is shown in FIG. 1, comprising a pair of front wheels 12a, 12b, and four real wheels 12c, 12d, 12e, 12f. As shown in FIG. 1 the front wheels 12a, 12b are joined by an axle 18, and the rear wheels 12c, 12d, 12e, 12f are joined by an axle 32. Elements 26a, 26b are shown, and these may simply be mechanical rods which generally support the structure as shown in FIG. 1.

As shown in FIG. 1 the vehicle includes an engine 14 and an associated transmission 16. A transmission 16 is connected to a driveshaft 28, which is connected to a joint 30 to drive the axle 32.

Also shown in FIG. 1 is a low pressure reservoir 22, a pump/motor 20, and a high pressure accumulator 24. As will be described further hereinbelow, the pump/motor provides an input to the low pressure reservoir 22, and receives an output from a low pressure reservoir 22. The pump/motor 20 also provides an input to the high pressure of accumulator 24, and receives an output from the high pressure accumulator 24. The pump/motor 20 receives energy from the turn of the axle 32 through the driveshaft 28, and delivers energy through the driveshaft 28 to the axle 32.

The low pressure reservoir may preferably be provided specifically for the described operation. The described operation thus preferably provides a closed system as will be discussed below.

With reference to FIG. 2, an operation in accordance with a preferred arrangement is described in more detail. FIG. 2 shows three parts: FIG. 2a, FIG. 2b and FIG. 2c.

In FIG. 2a the general structure of the system is shown as a valve 40 (or switch) and an accumulator 42. The valve 40 is a hydraulic valve, and the accumulator 42 is preferably a high pressure, hydraulic accumulator.

As shown in FIG. 2a, low pressure oil is provided on line 44 to the valve 40. With reference to FIG. 1 it can be appreciated that this low pressure oil on line 44 is provided from the low pressure reservoir 22. The oil is provided in the low pressure reservoir for the purposes of the described operation. The oil in this reservoir is separate to the engine oil.

The valve (or switch) 40 may be provided as part of the pump/motor 20 of FIG. 1.

The accumulator 42 corresponds to the high pressure accumulator of FIG. 1.

The valve 40 is connected to the accumulator 42 via a bidirectional communication 50. As will be described further hereinbelow, oil may be delivered from the valve 40 to the accumulator 42 using the connection 50, or oil may be delivered from the accumulator 42 to the valve 40 using the connection 50.

The valve 40 has an output 48, under which, as will be described further hereinbelow, oil under a high pressure is delivered.

The valve 40 receives a control signal on line 46, which controls how the valve is connected at any instant in time. As denoted by the dash lines in the valve 40 in FIG. 2a, the valve may be connected such that the input on line 44 is connected to line 50, or may be connected such that the output on line 48 is connected to line 50. When the input on line 44 is connected to line 50 then oil is delivered from line 44 through line 50 to the accumulator 42. When the output on line 48 is connected to line 50, then oil is delivered from the accumulator 42 through line 50 to the output 48.

In a simple example the control signal on line 46 may be provided simply by detecting whether the vehicle is currently braking or not braking. Therefore the signal on line 46 may be a mechanical signal to indicate braking or no-braking. This then can be used as a binary "switch" operation, to adjust the connections of the valve accordingly as now described.

The accumulator 42 has an oil chamber 41 and a compression chamber 43, which in FIG. 2a are denoted as being separated by a line 45. As denoted by di-directional arrow 47, the line 45 moves: as the oil chamber fills up the compression chamber fills up and the line 45 is pushed down. The oil is held under higher pressure as the oil chamber fills up. This means when the oil is released, as discussed below, it is released under high pressure.

The compression chamber 43 may, in practice, be a sealed gas chamber or a mechanical spring.

With reference to FIG. 2b, there is described an operation that occurs when braking is taking place. When braking is taking place, this is indicated by the control signal on line 46. The valve 40 may not receive a hydraulic control to switch its state, and its state will be as denoted in FIG. 2b, with the low pressure oil on line 44 being connected to the line 50 for delivery of the low pressure oil into the accumulator 42. The oil builds up in the accumulator 42 during this period in time.

The low pressure oil on line 44 may be provided intermittently, such as at a rate of 0-10 l/min or higher depending on turbine type. In the example of FIG. 2a, the low pressure oil 44 is shown being delivered directly to the valve 40. Referring once again to FIG. 1, the low pressure oil may be provided from the low pressure reservoir 22 to the pump/motor 20, before being delivered to the accumulator 42 by the valve 40. The accumulator may be understood as being equivalent to the high pressure accumulator 24 of FIG. 1. The pump/motor 20 is preferably a clutched hydraulic pump driven off the engine or transmission, operating at 0-200 bar. The pump may be engaged during braking in accordance with preferred embodiments, to deliver the oil supply on line 44 to the valve 40 during such braking operation. In other examples the pump may be engaged to deliver the low pressure oil on line 45 during some other instances, such as during long accelerations.

During vehicle braking, when the valve 40 is connected as shown in FIG. 2b and the low pressure oil on line 44 is delivered on line 50 to the accumulator 42, the oil is stored in the accumulator under high pressure. It can be understood that the accumulator 42 is "charging" during this process, as the pump forces oil inwards to the accumulator 42.

The oil chamber 41 thus increases in size as it fills up with oil, and the compression chamber 43 becomes more compressed. The line 45 moves downwards as denoted by the arrow 47 in FIG. 2b.

At a subsequent point in time after the braking operation finishes, acceleration of the vehicle takes place. An appropriate control signal on line 46 is delivered to the valve 40, and as denoted in FIG. 2c the valve 40 is connected such that the line 50 is connected to deliver oil from the accumulator 42 to the output line 48. This delivery of the control signal on line 46 may be by a combination of the braking operation ceasing, and detecting application of the acceleration operation.

On acceleration, the oil is released from the accumulator 42 via line 50 to line 48, to deliver high pressure oil. The oil stored in the accumulator 42 during braking is released under high pressure, to generate the high pressure oil supply on line 48.

The oil chamber 41 thus reduces in size as it releases oil under force from the compression chamber 43 forcing the line 45 upwards, as denoted by arrow 47.

The valve 40 may be implemented as a solenoid assembly to control the flows as described and in general may be considered a flow control mechanism or switch.

It will be understood from the foregoing that there is disclosed a closed system which uses oil which is separate to the engine oil. The oil in this closed system is transferred between the low pressure accumulator 22, the motor 20 (switch 40), and the accumulator 24/42.

Although not shown in FIGS. 2a to 2c, the oil must periodically be returned to the low pressure accumulator 22, which is a reservoir for the next braking event. The low pressure accumulator 22 may also be provided with a supply of oil as necessary.

The control which switches the states of the valve (or switch) 40, and which allows oil to be released from the accumulator, may utilise control signals from an engine management system, as will be understood by one skilled in the art. For example the braking can be detected by conventional means, using the accelerator pedal position, engine speed and vehicle speed signals, which are all "normal" means in current vehicles. For example vehicles are typically fitted with an engine management system which may permit electronic monitoring of any of the accelerator pedal position, the engine throttle position (if a throttle is used), the engine speed or the vehicle speed (which may be inferred by ABS braking sensors fitted to each axle or wheel). The engine management system may monitor some or all of these (and other parameters) to detect acceleration and deceleration events. In an automatic gearbox, for example, the same set of signals that are used to control the switching of gears are used.

During braking the accumulator may become full. This is preferably monitored. The system preferably requires the pressure to be monitored in the accumulator or the accumulator supply line. Once it reaches a target, the system is switched off (pump de-clutched and/or bypassed), and the vehicle slowed via conventional braking.

In practice this system would not solely be relied upon to provide all of the vehicle braking, but would be used in parallel with reduced conventional braking. The described system applies braking through the engine and drive train to the vehicle's road wheels. When this engine braking is disabled, e.g. because the clutch is disengaged, conventional braking still applies. This is the same principle as electric hybrid vehicle operation, in which typically some conventional braking is performed to maintain vehicle dynamic stability.

Thus if it is detected that the accumulator 42 is "full", the pumping of oil on line 44 may be terminated.

Figure 3:
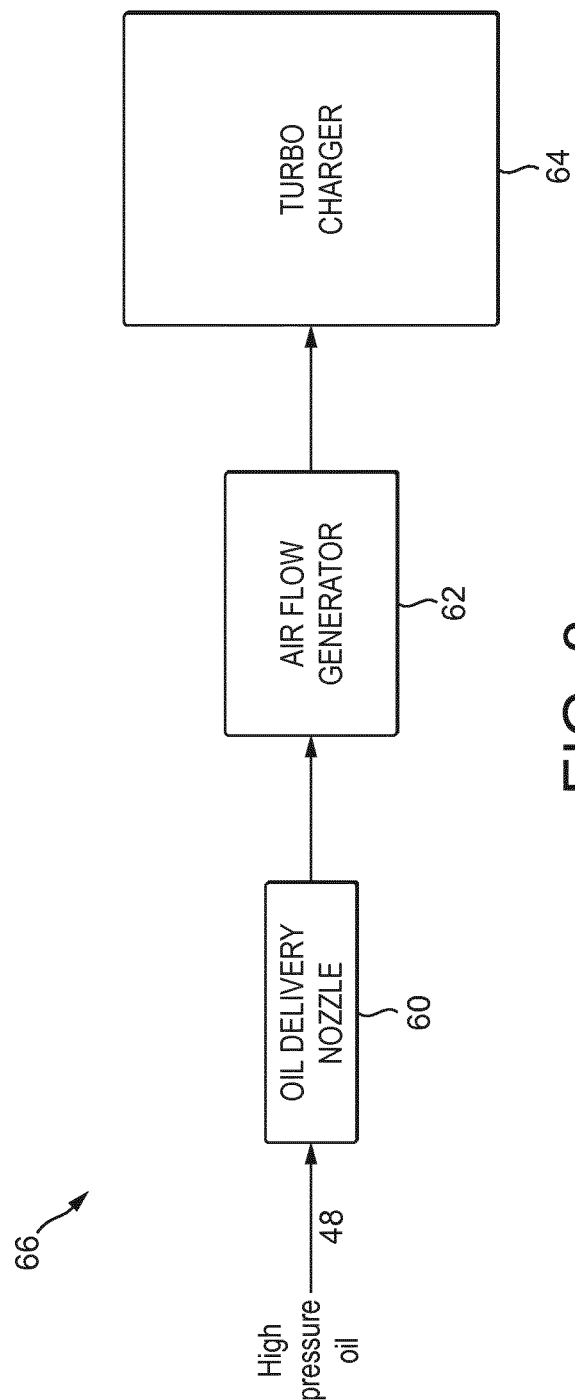
FIG. 3 illustrates exemplary elements associated with a turbocharger.

Turning to FIG. 3, when the high pressure oil is delivered on line 48 it is delivered generally to a turbocharger assembly as denoted by reference numeral 66. As illustrated in FIG. 3, the turbocharger assembly preferably includes an oil delivery nozzle 60, an air flow generator 62, and a turbocharger 64.

The high pressure oil on line 48 is delivered to the oil delivery nozzle 60, which delivers the oil in a desired way to the air flow generator 62. The air flow generator may be a Pelton wheel, which is excited by the high pressure oil delivered from the oil delivery nozzle. The Pelton wheel then generates an air flow into the turbocharger 64.

The objective of delivering the oil under pressure is to use the energy of oil flow to generate an air flow in the turbocharger. Thus the turbocharger is "spun-up" more quickly by the high pressure oil flow than it would otherwise be.

Figure 4:
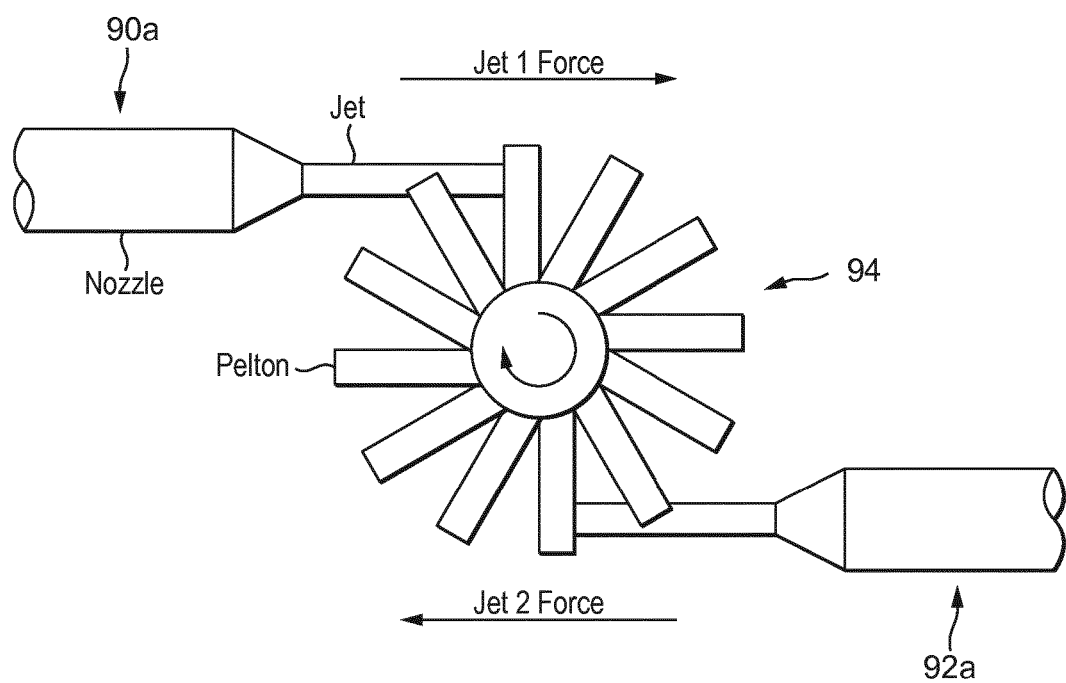
FIG. 4 illustrates an exemplary air flow generator for a turbocharger.

With reference to FIG. 4 there is shown an example implementation of the oil delivery nozzle 60 and air flow generator 62 of FIG. 3 in a turbocharger. As shown in FIG. 4, a Pelton wheel 94 is provided. Two mechanisms for providing a jet force of oil to the rotors of the Pelton wheel are provided, denoted by reference numerals 90a, 92a. Each receives the oil in a nozzle, to which a jet is connected to deliver the oil to the rotors. The jet of oil causes the Pelton wheel to rotate, which in turn generates an air flow from the rotating rotors.

It is possible to use more or less than two jets. The two jets shown are purely to cancel out a coupling moment that would adversely load and ultimately damage the bearing.

Also the implementation is not restricted to a pelton, but may be any turbine. In practice the pelton is well suited to implementations, but other turbine designs could be made to work with higher flow and lower pressure.

Figure 5:
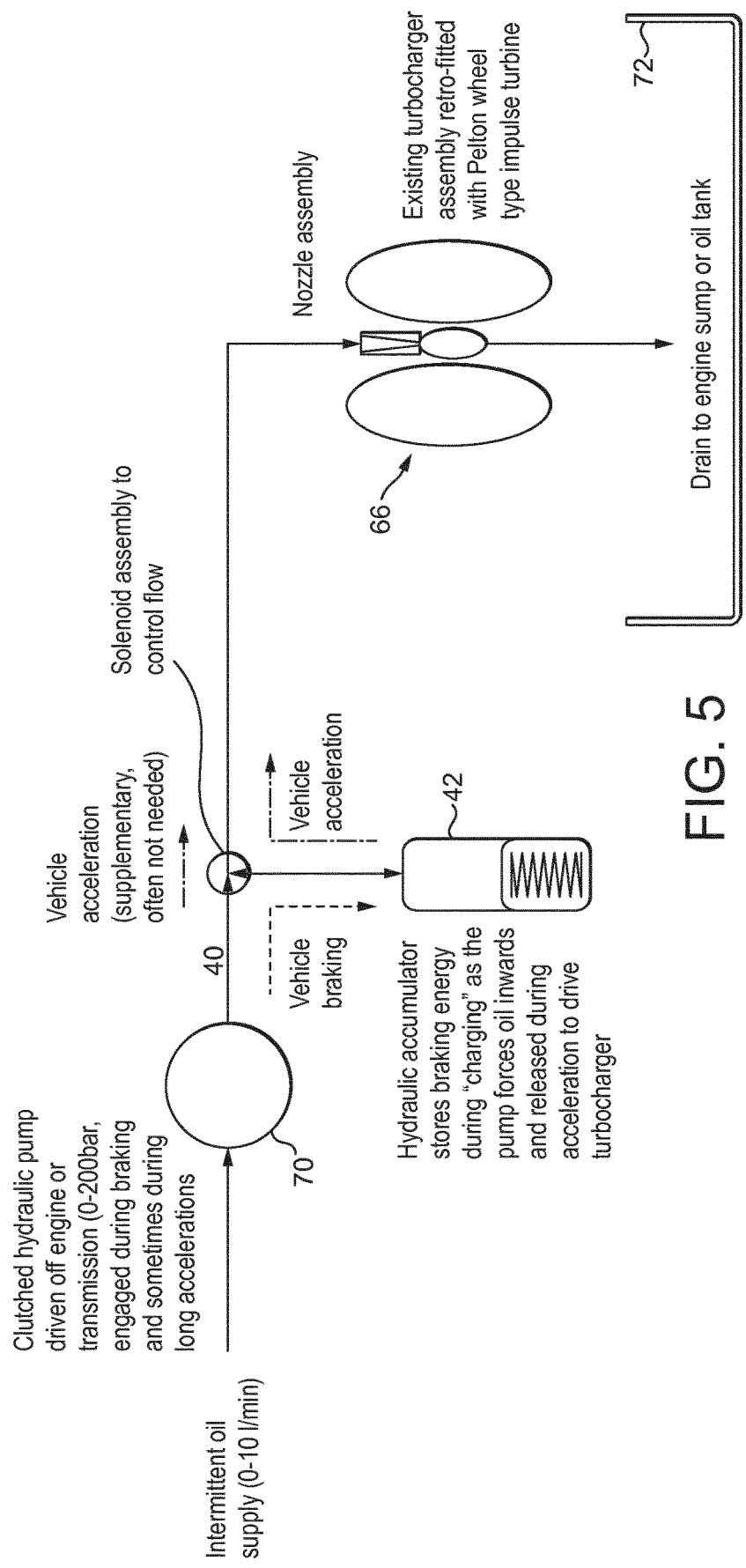
FIG. 5 illustrates an exemplary overview of a system.

With reference to FIG. 5 an overview of the foregoing system is illustrated. As shown an element 70 comprises the pump, which may correspond to the pump/motor 20 of FIG. 1. There is shown the valve 40 of FIG. 2 and the accumulator 42 of FIG. 2. Also shown is the turbocharger assembly 66.

Also shown in FIG. 5 is a tank 72, in which the oil generated to excite the air flow generation in the turbocharger assembly is drained to. The tank 72 is an engine sump or oil tank. The oil captured in the tank 72 may be returned to the low pressure reservoir 22.

The system as described may make use of a high pressure pump already existing in the engine, which is typical in the majority of diesel and gasoline engines.

If used in a hydraulic hybrid vehicle fitted with a turbocharged engine, the only modification that may be required is a modified turbocharger assembly, as the system can otherwise tap into the existing hydraulic circuit.

This modification is to convert the high pressure oil flow into an air flow by "spinning up" some rotational element with the high speed oil flow, the rotation generating an air flow.

In accordance with the described system, in recovering braking energy turbocharger lag is overcome, leading to a single turbocharger with lower exhaust back pressures and better fuel economy. Exhaust back pressure refers to gas pressure in the exhaust pipes. Any restriction leads to higher pressure at higher gas flow (higher engine speeds and/or loads). In modern diesels a variable geometry turbocharger effectively restricts the exhaust. At low speed this leads to high air flow and torque. As speed increases the variable geometry mechanism cannot be opened up sufficiently and chokes the engine, leading to the drop off in torque typical of diesels at higher engine speeds. The system described avoids the need for the variable geometry mechanism, meaning a less restricted exhaust, lower pressure in the exhaust and hence less effort required by the engine to push out the burned gases.

The described technique is applied to a turbocharger as opposed to another part of the vehicle engine system.

How the stored pressurised oil is used with a turbocharger is considered. There is more to be considered than just delivering the pressurized oil to the turbocharger. What the turbocharger needs is a quicker flow of air, and it is recognised that the energy of the capturing of the oil can be used to generate an air flow when it is released.

A further adaptation is made to allow the process to be used elsewhere in the engine for another purpose. There is not a direct link between capturing the oil, and generating a flow of air. A problem is recognised—the turbocharger lag—and a solution to it is provided by converting the oil compression energy into an air flow. Thus a problem is recognised and a solution provided which goes beyond simply capturing and releasing the oil energy.

The invention has been described with reference to a particular arrangement. One skilled in the art will appreciate that the invention is not limited to the described arrangement, and the appending claims set out the scope of the invention. In particular insofar as any embodiments or examples are described, various aspects of different embodiments and examples may be selectively chosen and selectively combined.

The invention claimed is:

1. A vehicle engine system comprising:
a hydraulic pump configured to provide an oil supply during braking;
an accumulator configured to:
  receive the oil supply during braking;
  store the oil supply under pressure; and
  release the oil supply under pressure during acceleration;
a turbine having rotors, the rotors configured to receive the oil supply released under pressure, and the turbine configured to be rotated by the oil supply released under pressure to generate an airflow directly from the rotating rotors of the turbine; and
a turbocharger configured to receive the airflow.

2. The vehicle engine system of claim 1 further comprising a nozzle for distributing the oil supply released under pressure.

3. The vehicle engine system of claim 1 wherein the accumulator comprises a compression chamber and an oil chamber, wherein the oil chamber expands as oil is stored, and the compression chamber applies compression to the oil chamber.

4. The vehicle engine system of claim 1 further comprising a valve for selectively routing the oil supply to the accumulator.

5. The vehicle engine system of claim 1 further comprising a valve for selectively delivering the oil supply from the accumulator.

6. The vehicle engine system of claim 1 wherein the rotational element is a Pelton wheel.

7. A method of controlling an engine including a turbocharger comprising:
storing oil under pressure during a hydraulic braking operation;
releasing the stored oil under pressure, during an acceleration operation, to the turbocharger;
rotating a turbine with the oil supply released under pressure, the turbine having rotors, the rotors for receiving the oil supply released under pressure and the turbine being rotated by the oil supply released under pressure; and
generating an air flow into the turbocharger directly from the rotating rotors of the turbine.

8. The method of claim 7 wherein the oil is stored when a clutch is engaged.

9. The method of claim 7 wherein the oil is released when a clutch is disengaged.

10. The method of claim 7 wherein the rotational element is a Pelton wheel.

* * * * *